US012669566B2

(12) United States Patent
Rezaei et al.

(10) Patent No.: US 12,669,566 B2
(45) Date of Patent: Jun. 30, 2026

(54) METHOD FOR POSITION ESTIMATION IN A POSITIONING SYSTEM

(71) Applicant: u-blox AG, Thalwil (CH)

(72) Inventors: Farshid Rezaei, Malmö (SE); Hariharasudhan Vigneswaran, Malmö (SE); Jakob Krantz, Malmö (SE); Matthias Mahlig, Berlin (DE)

(73) Assignee: u-blox AG, Thalwil (CH)

( * ) Notice: Subject to any disclaimer, the term of this patent is extended or adjusted under 35 U.S.C. 154(b) by 321 days.

(21) Appl. No.: 18/340,392

(22) Filed: Jun. 23, 2023

(65) Prior Publication Data

US 2024/0004020 A1 Jan. 4, 2024

(30) Foreign Application Priority Data

Jun. 30, 2022 (EP) ..................................... 22182189

(51) Int. Cl.
G01S 5/02 (2010.01)

(52) U.S. Cl.
CPC ................................ G01S 5/02216 (2020.05)

(58) Field of Classification Search
CPC ...................... G01S 5/02216; G01S 5/00–145
See application file for complete search history.

(56) References Cited

U.S. PATENT DOCUMENTS

| | | | |
|---|---|---|---|
| 10,660,060 B1 | 5/2020 | Bilstad | |
| 2002/0186167 A1 | 12/2002 | Anderson | |
| 2016/0100289 A1 | 4/2016 | Mayorchik et al. | |
| 2020/0383070 A1 | 12/2020 | Farrell et al. | |
| 2024/0244546 A1 * | 7/2024 | Abir ...................... | H04B 17/27 |

FOREIGN PATENT DOCUMENTS

WO WO-03056356 A1 * 7/2003 ......... G01S 5/02527

OTHER PUBLICATIONS

Extended Search Report in European Appln. No. 22182189.5, dated Dec. 22, 2022, 11 pages.

* cited by examiner

*Primary Examiner* — Cassi J Galt

(74) *Attorney, Agent, or Firm* — Fish & Richardson P.C.

(57) ABSTRACT

A method for position estimation in a positioning system includes receiving, by locator devices, positioning signals from a mobile device, generating positioning information with associated synchronization identifiers based on the respective received positioning signals, and providing the positioning information with the associated synchronization identifiers to a positioning engine. The positioning engine compiles a set of related positioning information selected from the provided positioning information based on a similarity measure of the associated synchronization identifiers, and determines an estimated position of the mobile device based on the set of related positioning information.

11 Claims, 4 Drawing Sheets

Channel hopping instances over time

METHOD FOR POSITION ESTIMATION IN A POSITIONING SYSTEM

CROSS-REFERENCE TO RELATED APPLICATIONS

This application claims priority to European Application No. 22182189.5, filed on Jun. 30, 2022, the contents of which are incorporated herein by reference in their entirety.

TECHNICAL FIELD

This disclosure relates to a method for position estimation in a positioning system. The disclosure further relates to a locator device, a positioning engine and a mobile device.

BACKGROUND ART

In many applications like indoor positioning systems, IPS, or real-time location services, RTLS, one key element is to determine a position of a mobile device like a tag based on positioning information relative to a plurality of locator devices. The mobile device transmits regularly positioning signals. Upon receiving positioning signals transmitted by the mobile device, the locator devices generate positioning information, e.g., based on arriving angles of positioning signals, to a positioning engine. The positioning engine determines the position of the mobile device based on positioning information from the locator devices.

Ideally, a positioning engine receives regularly positioning information from locator devices, and the positioning information received within a time frame reflects a position of a mobile device when it transmits a positioning signal. However, in real-life, multiple things can go wrong throughout the process in a positioning system. For example, packets carrying positioning signals over wireless channels may get lost, or, locator devices may experience different wireless channel latencies, or have different signal processing delays, or perform buffering or averaging in generating positioning information. In such situations, positioning information from multiple locator devices within a same time frame may not reflect the position of a mobile device at a same time instant. This will lead to wrong determinations of position of a mobile device.

In conventional positioning systems such situations are not addressed.

SUMMARY OF INVENTION

An object to be achieved is to provide an improved concept for estimating of positions in a positioning system with higher accuracy.

This object is achieved with the subject-matter of the independent claims. Embodiments and developments derive from the dependent claims.

According to the present disclosure, in a positioning system, a mobile device regularly transmits positioning signals in order to get its updated position. Multiple locator devices listen to the mobile device and receive the positioning signals from the mobile device. The locator devices generate positioning information based on the received positioning signals. The positioning information includes information which allow to derive the position of the mobile device by a positioning engine, e.g., information which reflects distance and/or direction to the mobile device. The locator devices e.g. provide the positioning information to a positioning engine. The positioning engine determines the position of the mobile device based on the positioning information. For example, the positioning engine calculates the position of the mobile device using distances and/or directions between the mobile device and the locator devices derived from the positioning information.

The improved positioning concept is based on the idea that synchronization identifiers are introduced into a positioning system for synchronizing positioning information from multiple locator devices. When generating positioning information, locator devices generate and associate synchronization identifiers with positioning information.

When determining the position of a mobile device, a positioning engine selects a set of positioning information based on the associated synchronization identifiers. The selected set of positioning information is used for determining the position of a mobile device.

With the synchronization identifiers the determination of position can be based on synchronized positioning information. Unsynchronized positioning information due to transmission and processing problems can be identified and excluded from the determination of position. Therefore, an accuracy of the determination of position can be improved.

According to the present disclosure, the method for position estimation in a positioning system comprises that at least two of a plurality of locator devices receive respective positioning signals from a mobile device; from each received positioning signal, each locator device generates a positioning information and an associated synchronization identifier corresponding to the respective received positioning signal; each positioning information with the associated synchronization identifier is provided to a positioning engine in the positioning system; a positioning engine compiles a set of related positioning information selected from the provided positioning information based on a similarity measure of the associated synchronization identifiers; and the positioning engine determines an estimated position of the mobile device based on the set of related positioning information.

In some implementations, more than two of a plurality of locator devices are involved to perform the set of steps of the method for position estimation in a positioning system.

In an example implementation, the associated synchronization identifier is generated based on a value, for example, a counter value, which value is included in payload data of the positioning signal. In this example implementation, a mobile device may keep a counter. At every transmission of a positioning signal, the mobile device updates the value of the counter. For example, it increases the value by one. In a positioning signal, the mobile device includes the value respectively the counter value, in the payload data of the positioning signal. Each positioning signal is thus associated with a specific value, e.g. a counter value. Each locator device receives a positioning signal with such value. It generates respective positioning information, e.g. a distance value and/or an angle of arrival, AoA, based on the reception of the positioning signal, and associates it with a synchronization identifier containing or being based on the received value. Each positioning information at a time instant from a locator device is thus associated with a synchronization identifier.

In another example implementation of the method for position estimation in a positioning system, the associated synchronization identifier is generated based on channel characteristics of a transmission of the positioning signal. The channel of transmitting positioning signals may possess channel characteristics that are changing over time. A transmission of the positioning signal possesses channel characteristics that are different for each transmission.

For example, the channel characteristics include a predetermined sequence of transmission channels between a mobile device and multiple locator devices in a positioning system. For example, in a channel hopping scheme, the frequencies of the transmission channels may vary over time. A predetermined sequence of the transmission channels over different frequencies is available between a mobile device and the locator devices. The predetermined sequence of the transmission channels reflects the channel characteristics of transmitting positioning signals.

In an example implementation, synchronization identifiers are generated based on at least two channel indices of transmission channels of the predetermined sequence of transmission channels. Each of the at least two channel indices include a channel index of the transmission channel of the respective received positioning signal. For example, in a channel hopping scheme, transmission channels over different frequencies in a predetermined sequence are assigned with channel indices. Each channel index corresponds to a transmission channel in the predetermined sequence. Each transmission channel of a received positioning signal is associated with a channel index. The synchronization identifier may be generated based on the channel index of the transmission channel used for transmitting the positioning signal and on at least a second channel index having a predefined index distance in the predetermined sequence of transmission channels. For example, the preceding or the subsequent channel index in the predetermined sequence, relative to the channel index of the transmission channel used for transmitting the positioning signal, may be used as the at least second channel index, corresponding to an index distance of −1 respectively +1. As long as all locator devices use the same index distance, a unique synchronization identifier can be generated. Additional channel indices, e.g. relative to the channel index of the transmission channel used for transmitting the positioning signal, may be used for generating the synchronization identifier. This may further reduce the risk of ambiguities of the synchronization identifier.

In addition, or as an alternative, channel characteristics may include a counter parameter for determining the sequence of transmission channel and synchronization identifiers are generated based on a value of the counter parameter used for determining the transmission channel of the respective received positioning signal. For example, in a channel hopping scheme, a counter parameter is used to determine a sequence of transmission channels between a mobile device and locator devices. The mobile device advertises an initial value of the counter parameter. The value of the counter parameter varies in determining each transmission channel. Each value is used for each transmission channel of a received positioning signal at each locator device. Each synchronization identifier may include a value of the counter parameter or a value derived thereof to correspond to a received positioning signal.

In an example implementation, each synchronization identifier corresponds to a time instant of transmission of the respective positioning signal, and a similarity measure for selecting a set of related positioning information includes the respective time instants of the synchronization identifiers being within a common time frame of the set. Hence, positioning signals having a close timing due to being within the common time frame can be grouped together for estimating the position, e.g. assuming that no substantial relocation of the mobile device happened during the common time frame.

For example, in such implementations, the similarity measure for selecting a set of related positioning information may include the respective synchronization identifiers being identical. For example, this can be seen as considering only positioning information of a single time instant for the position estimation in the positioning engine.

The present disclosure further provides a locator device according to the improved concept for a positioning system with a positioning engine. For example, for performing the respective actions in the method for position estimation in a positioning system, a locator device may be configured to receive a positioning signal from a mobile device, and from the received positioning signal, to generate positioning information and an associated synchronization identifier corresponding to the received positioning signal, and to provide the positioning information with the associated synchronization identifier to a positioning engine.

In some implementations the locator device is configured to generate the associated synchronization identifier based on a value, in particular a counter value, included in payload data of the received positioning signal.

In some implementations the locator device is configured to generate the associated synchronization identifier based on channel characteristics of a transmission of the received positioning signal. For example, the channel characteristics include a predetermined sequence of transmission channels between the mobile device and the locator device.

Further implementations of the locator device become readily apparent from the various implementations described above in conjunction with the method.

The present disclosure further provides a positioning engine according to the improved concept for a positioning system with a plurality of locator devices. For example, for performing the respective actions in a method for position estimation in a positioning system, a positioning engine may be configured to receive respective positioning information with an associated synchronization identifier from at least two of the plurality of locator devices. Each positioning information is based on a respective positioning signal transmitted between a mobile device and the respective locator device. The associated synchronization identifier corresponds to the respective received positioning signal. The positioning engine compiles a set of positioning information selected from the received positioning information based on a similarity measure of the associated synchronization identifiers. For example, the positioning engine selects a set of positioning information with synchronization identifiers that are in a common time frame or are identical. The positioning engine determines an estimated position of the mobile device based on the set of related positioning information.

Further implementations of the positioning engine become readily apparent from the various implementations described above in conjunction with the method.

A positioning system according to the improved concept may comprise at least two locator devices configured according to one of the above implementations and a positioning engine configured according to one of the above implementations.

For performing the respective actions in a method for position estimation in a positioning system, in some implementations, a mobile device may be configured to transmit a positioning signal with a counter value in the payload data of the positioning signal to a plurality of locator devices. For example, the mobile device keeps a counter for transmitted positioning signals and increments this counter with every positioning signal transmitted.

Further implementations and developments in a positioning system become readily apparent for the skilled reader from the various implementations described above in conjunction with the method for position estimation in a positioning system.

BRIEF DESCRIPTION OF DRAWINGS

The improved positioning concept will be explained in more detail in the following with the aid of the drawings. In the Drawings.

DETAILED DESCRIPTION

Figure 1:
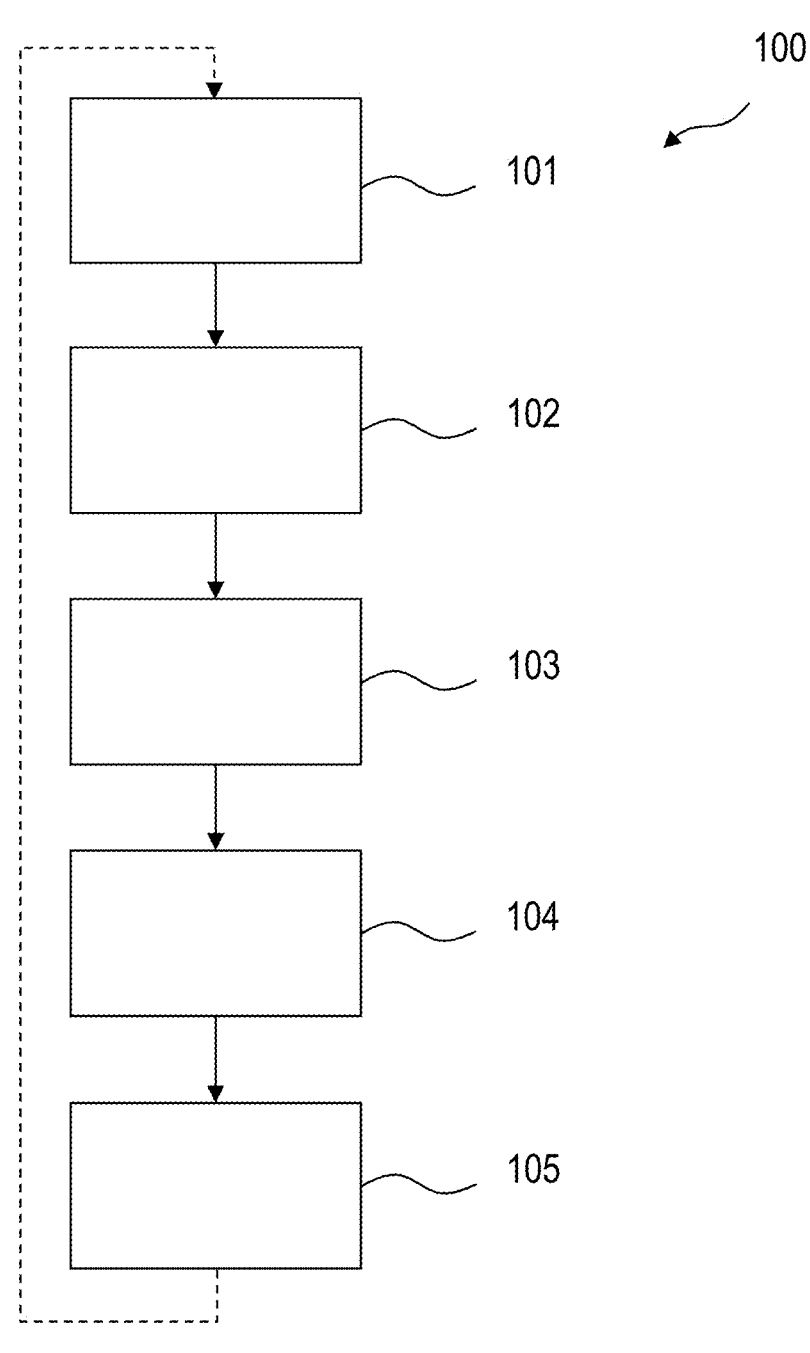
FIG. 1 shows a flowchart of a method for position estimation in a positioning system.

FIG. 1 shows a flow diagram of an example implementation of a method 100 for position estimation in a positioning system.

Figure 2:
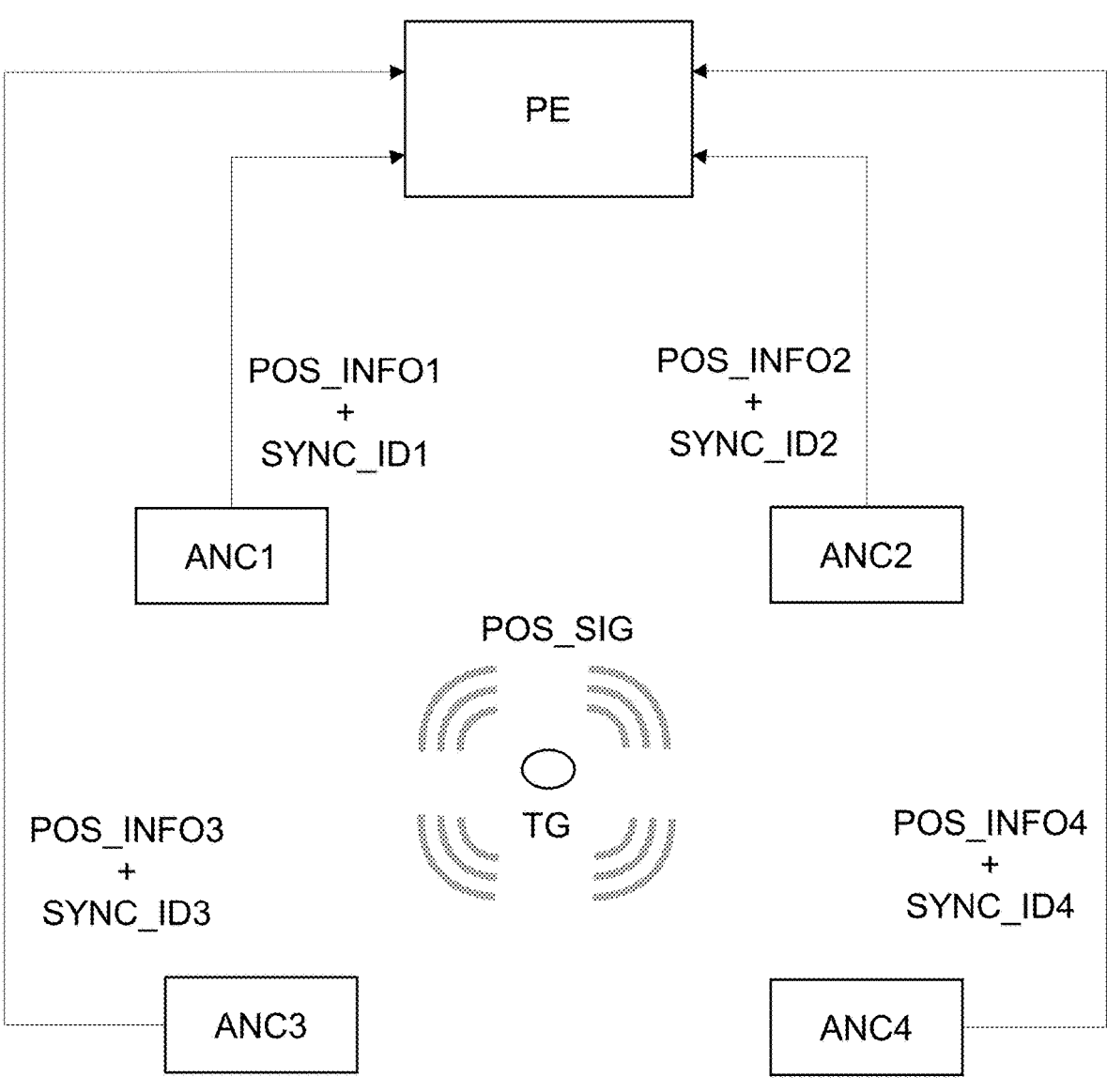
FIG. 2 shows an example implementation of a positioning system.

An example implementation of such a positioning system is shown in FIG. 2. Such a positioning system comprises a plurality of locator devices ANC1, ANC2, ANC3, ANC4 and a positioning engine PE. The chosen numbers for the locator devices should serve only as an example and other numbers of locator devices could be chosen as well. The locator devices ANC1 to ANC4 are located in an area. The positioning engine PE is in communication with the locator devices ANC1 to ANC4. At least one mobile device TG is located in the area.

The mobile device TG can be a tag that transmits radio frequency, RF, signals like a Bluetooth direction finding signal, which includes a constant tone extension packet, CTE. Other RF signals like Wi-Fi signals, ultra-wideband, UWB, or cellular signals could be used as an alternative, for example. Such signals are transmitted between the mobile device and the locator devices ANC1 to ANC4 regularly to get updated position or when position of the mobile device is needed. For example, the respective RF signals received by one of the locator devices can be used to determine a direction, a distance, or a direction and a distance between the locator device and the mobile device. The received signal strength, the angle of arrival, AoA, are examples for determining a distance and a direction, respectively. Such determinations can be summarized as positioning information to reflect a position of the mobile device relative to the respective locator device. Corresponding methods for determining such positioning information are known to the skilled person and therefore not described in more detail here.

The positioning information is further provided to the positioning engine PE in the positioning system. The positioning engine PE compiles positioning information from locator devices in the area and determines the position of the mobile device TG in the area. Corresponding methods for generally determining such position of a mobile device are known to the skilled person and therefore not described in more detail here.

Referring back to FIG. 1, in step 101, at least two of a plurality of locator devices ANC1 to ANC4 receive respective positioning signals POS_SIG from the mobile device TG. For example, each of the locator devices ANC1, ANC2, ANC3, ANC4 receives a respective positioning signal POS_SIG from the mobile device TG.

In step 102, from each received positioning signal, positioning information and an associated synchronization identifier corresponding to the respective received positioning signal are generated. For example, each of the locator devices ANC1 to ANC4 generates a positioning information of POS_INFO1 to POS_INFO4 and an associated synchronization identifier of SYNC_ID1 to SYNC_ID4 corresponding to the respective received positioning signal POS_SIG.

In one implementation of step 102, a locator device may generate a synchronization identifier based on a value, for example a counter value in a received positioning signal. The counter value can be included in the payload data of the positioning signal. For example, each mobile device may keep a counter for transmitted positioning signals and transmits the counter value in the payload data of each positioning signal. A locator device may generate a synchronization identifier, e.g. including a counter value in the received positioning signal or a value derived thereof. The synchronization identifier including the counter value may reflect the time instant of the received positioning signal.

In one implementation of step 102, generating an associated synchronization identifier can be based on channel characteristics of a transmission of the positioning signal. For example, a locator device can generate a synchronization identifier based on channel characteristics that reflect a time instant of a transmission of a positioning signal.

In such an implementation, the channel characteristics may include a predetermined sequence of transmission channels between the mobile device and the plurality of locator devices. A locator device may generate a synchronization identifier based on channel characteristics that include the predetermined sequence of transmission channels.

Figure 3:
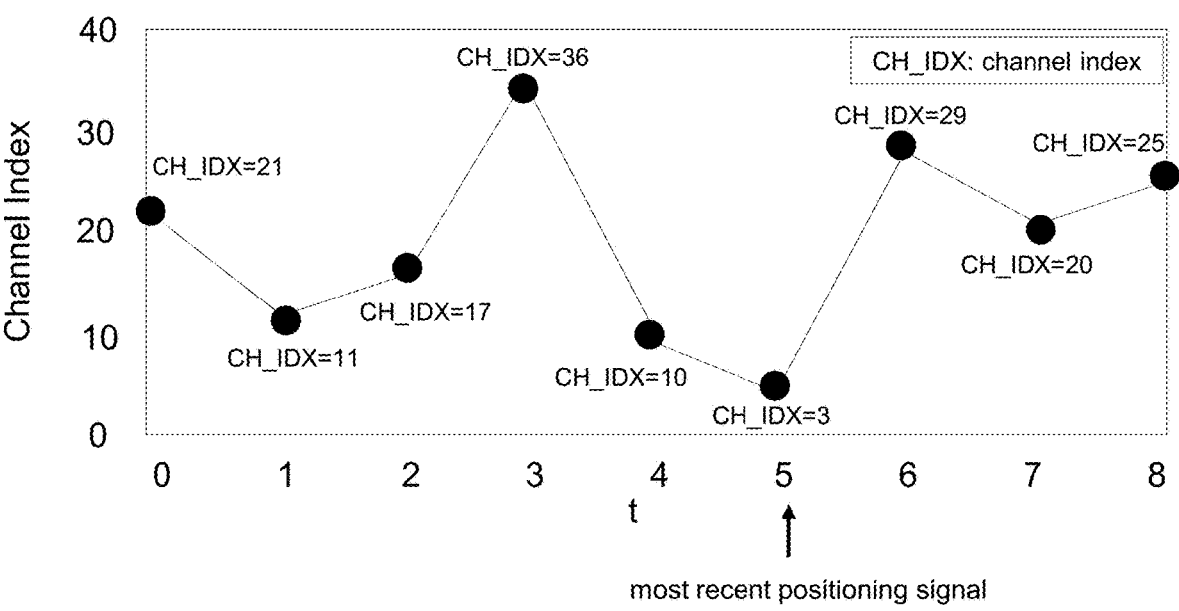
FIG. 3 shows an example pattern of channel hopping.
Figure 3:
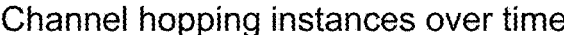

For example, a channel transmitting positioning signals between a mobile device and locator devices may apply a frequency hopping scheme. FIG. 3 shows an example of a channel hopping pattern over time. The channel frequency hops at each time instant. A set of frequencies that the channels can use may be predetermined. A sequence of frequencies in the set at a sequence of time instants may be predetermined. Each frequency in the sequence corresponds to a time instant. Each frequency in the set is assigned with an index. Each index corresponds to a transmission channel of a positioning signal using the corresponding frequency.

Referring back to FIG. 1, in an example implementation of step 102 with such an example hopping scheme, a locator device can generate a synchronization identifier based on at least two channel indices, each of which corresponds to a transmission channel of a positioning signal. For example, a synchronization identifier may be generated based on a first channel index of the transmission channel used for transmitting the most recent positioning signal, and on at least a second channel index having a predefined index distance to the first channel index in the predetermined sequence of transmission channels, e.g. the second channel index may be the preceding or the subsequent channel index in the predetermined sequence relative to the first channel index, corresponding to the preceding or the subsequent transmission channel in the predetermined sequence. In such an example, a predefined index distance may be −1 (corresponding to the preceding transmission channel) or +1 (corresponding to the subsequent transmission channel). FIG. 3 shows further an example of generating a synchronization identifier based on a first and a second channel index. In this example the transmission channel used for transmitting the most recent positioning signal has a channel index of 3, corresponding to time instant 5. Assuming the predefined index distance is −1, the second channel index having an index distance of −1 is 10, corresponding to time instant 4, which is the preceding channel index relative to the first channel index. The synchronization identifier is thus generated based on channel indices 3 and 10.

All locator devices in the area use the same manner and the same predefined index distance to generate synchronization identifiers. The synchronization identifier is thus unique for a time instant and can reflect the time instant that a locator device receives the most recent positioning signal. Additional channel indices, e.g. relative to the channel index of the transmission channel used for transmitting the most recent positioning signal, can be used for generating the synchronization identifier. This may further reduce the risk of ambiguities of the synchronization identifier.

In such an example hopping scheme, the scheme may make use of a counter parameter to determine a predetermined sequence of transmission channels. With a different value of the counter parameter as one of the inputs, the hopping scheme outputs a transmission channel, e.g., a frequency channel in the sequence to be used at a time instant. To predetermine a sequence of frequencies, the values of the counter parameter vary for different time instants to output different frequencies. The variation of the values of the counter parameter depends on the hopping scheme. The mobile device advertises an initial value of the counter parameter. With the initial value of the counter parameter, the mobile device and the locator device in the area can predetermine a sequence of frequencies to be used at a sequence of time instants respectively for the channels transmitting positioning signals.

In an example embodiment of step 102 with such an example hopping scheme, a locator device can generate a synchronization identifier based on a value of the counter parameter of the hopping scheme. The value of the counter parameter corresponds to a transmission channel of the received positioning signal. For example, a mobile device advertises an initial value of the counter parameter of a hopping scheme. The mobile device and the locator devices in the area uses the counter parameter to determine a sequence of frequencies of channels for transmitting positioning signals at a sequence of time instants. A locator device can include the value of the counter parameter or a value derived thereof in a synchronization identifier. The value corresponds to the frequency and the time instant of receiving a positioning signal. The synchronization identifier including the value of the counter parameter reflects the time instant of a received positioning signal.

In step 103, each positioning information with an associated synchronization identifier is provided to the positioning engine PE. For example, a locator device provides its positioning information with an associated synchronization identifier to the positioning engine PE. The positioning engine PE receives from at least two of a plurality of locator devices ANC1 to ANC4 respective positioning information POS_INFO1 to POS_INFO4 with the associated synchronization identifiers SYNC_ID1 to SYNC_ID 4 corresponding to respective received positioning signals POS_SIG.

In step 104, a set of related positioning information selected from provided positioning information is compiled based on a similarity measure of the associated synchronization identifiers. For example, the positioning engine PE performs a similarity measure of associated synchronization identifiers and compiles the set of selected positioning information based on the similarity measure.

In an example implementation of step 104, each synchronization identifier corresponds to a time instant of transmission of a positioning signal. For example, synchronization identifiers from at least two locator devices may include one of the above alternatives, e.g., counter values, or channel indices or values of a counter parameter.

Each synchronization identifier reflects a time instant of a received positioning signal of a locator device. A similarity measure for selecting a set of related positioning information may include the respective time instants of the synchronization identifiers being within a common time frame of the set. For example, time instants of synchronization identifiers from different locator devices within a common time frame correspond to positioning signals received by different locator devices within a common time frame and thus are considered similar. Hence the positioning engine selects a set of positioning information with synchronization identifiers corresponding to time instants being within the common time frame. In some implementations, the positioning engine can determine a time frame for the similarity measure. For example, the positioning engine may determine a small-time frame, when synchronization is strictly required. The positioning engine may determine a larger time frame, when synchronization is less strictly required.

In another example implementation of step 104, the similarity measure for selecting a set of related positioning information includes the respective synchronization identifiers being identical. For example, the positioning engine may determine to select a set of positioning information associated with identical synchronization identifiers. Thus, the set of positioning information corresponding to positioning signals at a same time instant is selected.

In step 105, an estimated position of the mobile device TG is determined based on the set of related positioning information. The set of related positioning information is selected based on the above similarity measure. Given synchronized positioning information, the position estimation itself is known to the skilled person and therefore not described in more detail here.

The method 100 can be performed continuously, such that the method starts over with step 101 by receiving further positioning signals.

A positioning system may include at least two locator devices and a positioning engine to carry out various implementations of the method 100 for position estimation of a mobile device. A mobile device is not necessarily part of the positioning system but only needs to be present in an area covered by the positioning system during operation. In some embodiments, more than two locator devices are involved to carry out various implementations of the method 100.

Figure 4:
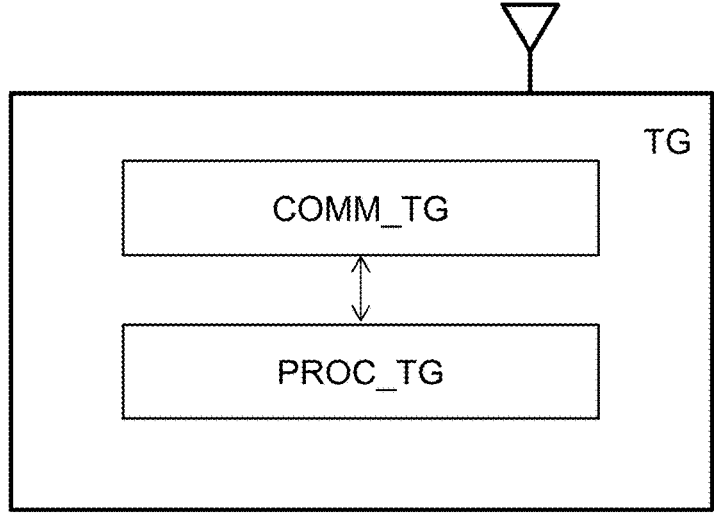
FIG. 4 shows an example implementation of a mobile device.

FIG. 4 shows an example implementation of a mobile device TG comprising a communication unit COMM_TG and a processing unit PROC_TG. The communication unit COMM_TG of the mobile device may be configured to transmit positioning signals via a wireless interface symbolized by an antenna. The processing unit PROC_TG may be configured to keep a counter and update the counter values.

Figure 5:
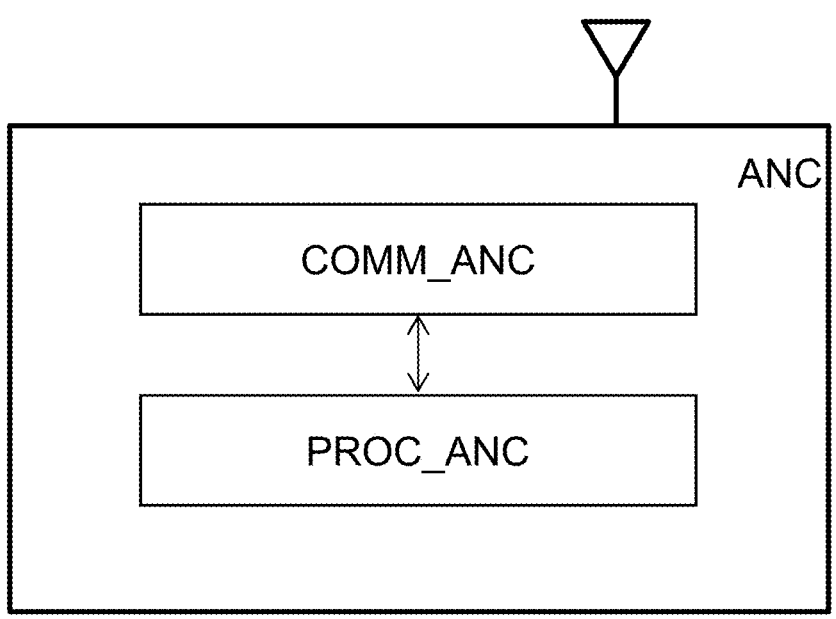
FIG. 5 shows an example implementation of a locator device.

FIG. 5 shows an example implementation of a locator device ANC comprising a communication unit COMM_ANC and a processing unit PROC_ANC. The communication unit COMM_ANC of the locator device ANC may be configured to receive positioning signals from a mobile device via a wireless interface symbolized by an antenna and provide positioning information to a positioning engine via a network interface. The processing unit PROC_ANC of the locator device ANC may be configured to generate positioning information and associated synchronization identifiers.

Figure 6:
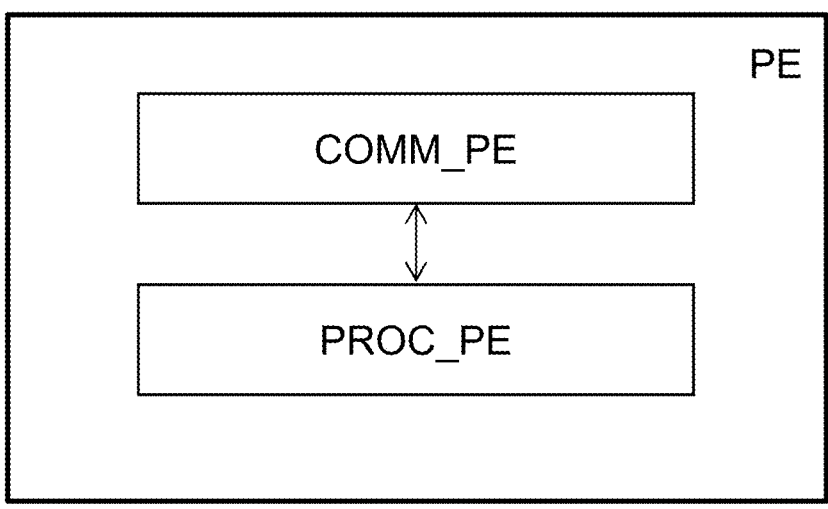
FIG. 6 shows an example implementation of a positioning engine.

FIG. 6 shows an example implementation of a positioning engine PE comprising a communication unit COMM_PE and a processing unit PROC_PE. The communication unit COMM_PE of the positioning engine PE may be configured to receive positioning information with associated synchronization identifiers from locator devices via a network interface. The processing unit PROC_PE of the positioning engine may be configured to compile the positioning information and determine an estimated position of the mobile device based on a set of related positioning information.

Hence, with the various implementations described above for the improved determination of position in a positioning system, positioning information can be synchronized for multiple locator devices confronting different transmission or processing problems. Unsynchronized respectively unrelated positioning information can be identified and excluded. Synchronized positioning information can be identified and used for an improved accuracy of the determination of position.

Various embodiments of the improved positioning concept can be implemented in the form of logic in software or hardware or a combination of both. The logic may be stored in a computer readable or machine-readable storage medium as a set of instructions adapted to direct one or more processors of a (distributed) computer system to perform a set of steps disclosed in embodiments of the improved processing concept. The logic may form part of a computer program product adapted to direct an information-processing device to automatically perform a set of steps disclosed in embodiments of the improved processing concept.

The specification and drawings are, accordingly, to be regarded in an illustrative rather than a restrictive sense. However, it will be evident that various modifications and changes may be made thereunto without departing from the scope of the invention as set forth in the claims.

| LIST OF REFERENCE SIGNS | |
| --- | --- |
| 100 | method |
| 101-105 | steps |
| ANC1, ANC2, ANC3, ANC4, ANC | locator device |
| TG | mobile device |
| PE | positioning engine |
| POS_SIG | positioning signal |
| POS_INFO1 to POS_INFO4 | positioning information |
| SYNC_ID1 to SYNC_ID4 | synchronization identifier |
| COMM_TG, COMM_ANC, COMM_PE | communication unit |
| PROC_TG, PROC_ANC, PROC_PE | processing unit |

The invention claimed is:

1. A method for position estimation in a positioning system with a plurality of locator devices and a positioning engine, the method comprising receiving, by at least two of the plurality of locator devices, respective positioning signals from a mobile device;

generating, from each received positioning signal, a positioning information and an associated synchronization identifier corresponding to the respective received positioning signal;

providing each positioning information with the associated synchronization identifier to the positioning engine;

compiling, in the positioning engine, a set of related positioning information selected from the provided positioning information based on a similarity measure of the associated synchronization identifiers; and determining an estimated position of the mobile device based on the set of related positioning information, wherein generating the associated synchronization identifier is based on channel characteristics of a transmission of the positioning signal, wherein the channel characteristics include a predetermined sequence of transmission channels between the mobile device and the plurality of locator devices, and wherein generating the associated synchronization identifier is based on at least two channel indices of transmission channels of the predetermined sequence of transmission channels, each of the at least two channel indices including a channel index of the transmission channel of the respective received positioning signal.

2. The method according to claim 1, wherein generating the associated synchronization identifier is based on a counter value included in payload data of the positioning signal.

3. The method according to claim 1, wherein:

the channel characteristics includes a counter parameter for determining the sequence of transmission channels; and generating the associated synchronization identifier is based on a value of the counter parameter used for determining the transmission channel of the respective received positioning signal.

4. The method according to claim 1, wherein:

each synchronization identifier corresponds to a time instant of transmission of the respective positioning signal; and the similarity measure for selecting the set of related positioning information includes the respective time instants of the synchronization identifiers being within a common time frame of the set.

5. The method according to claim 1, wherein the similarity measure for selecting the set of related positioning information includes the respective synchronization identifiers being identical.

6. A locator device for a positioning system with a positioning engine, the locator device comprising:

a communication unit configured to receive positioning signals, wherein the communication unit comprises a wireless interface;

at least one processor, non-transitory computer-readable media storing instructions that, when executed by the at least one processor, cause the locator device to perform operations comprising:

receive a positioning signal from a mobile device;

generate, from the received positioning signal, a positioning information and an associated synchronization identifier corresponding to the received positioning signal; provide the positioning information with the associated synchronization identifier to the positioning engine;

compile, in the positioning engine, a set of related positioning information selected from the provided positioning information based on a similarity measure of the associated synchronization identifiers; and determine an estimated position of the mobile device based on the set of related positioning information, wherein generating the associated synchronization identifier is based on channel characteristics of a transmission of the positioning signal, wherein the channel characteristics include a predetermined sequence of transmission channels between the mobile device and the locator device, and wherein generating the associated synchronization identifier is based on at least two channel indices of transmission channels of the predetermined sequence of transmission channels, each of the at least two channel indices including a channel index of the transmission channel of the respective received positioning signal.

7. The locator device according to claim 6, the non-transitory computer-readable media further storing instructions that, when executed by the at least one processor, cause the at least one processor to perform operations including:

generate the associated synchronization identifier based on a counter value included in payload data of the received positioning signal.

8. A method for position estimation in a positioning system with a plurality of locator devices and a positioning engine, the method comprising receiving, by at least two of the plurality of locator devices, respective positioning signals from a mobile device;

generating, from each received positioning signal, a positioning information and an associated synchronization identifier corresponding to the respective received positioning signal;

providing each positioning information with the associated synchronization identifier to the positioning engine;

compiling, in the positioning engine, a set of related positioning information selected from the provided positioning information based on a similarity measure of the associated synchronization identifiers; and determining an estimated position of the mobile device based on the set of related positioning information, wherein generating the associated synchronization identifier is based on channel characteristics of a transmission of the positioning signal, wherein the channel characteristics include a predetermined sequence of transmission channels between the mobile device and the plurality of locator devices, and wherein the channel characteristics includes a counter parameter for determining the sequence of transmission channels, and generating the associated synchronization identifier is based on a value of the counter parameter used for determining the transmission channel of the respective received positioning signal.

9. The method of claim 8, wherein generating the associated synchronization identifier is based on a counter value included in payload data of the positioning signal.

10. The method of claim 8, wherein:

each synchronization identifier corresponds to a time instant of transmission of the respective positioning signal; and the similarity measure for selecting the set of related positioning information includes the respective time instants of the synchronization identifiers being within a common time frame of the set.

11. The method of claim 8, wherein the similarity measure for selecting the set of related positioning information includes the respective synchronization identifiers being identical.

\* \* \* \* \*